June 19, 1951  C. H. SCOTT  2,557,316
SETTLER
Filed May 18, 1949  11 Sheets-Sheet 1
FIG. 1.
14-Centerpier
28-Motor
30-Driven carrier-Non-liftable
31-Spider-Non-liftable
32-Cylinder-Non-liftable
34-Feedwell
40-Rake-structure-Liftable
50-Pull-rods-Movable
80-Lift-rods-Movable
125-Centering-rods-Movable
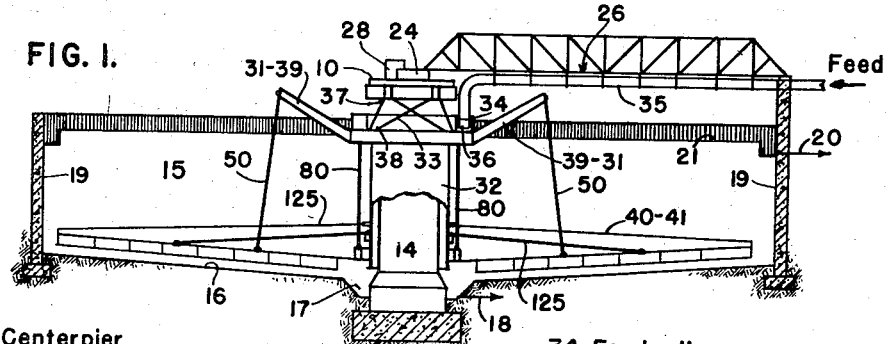
FIG. 2.
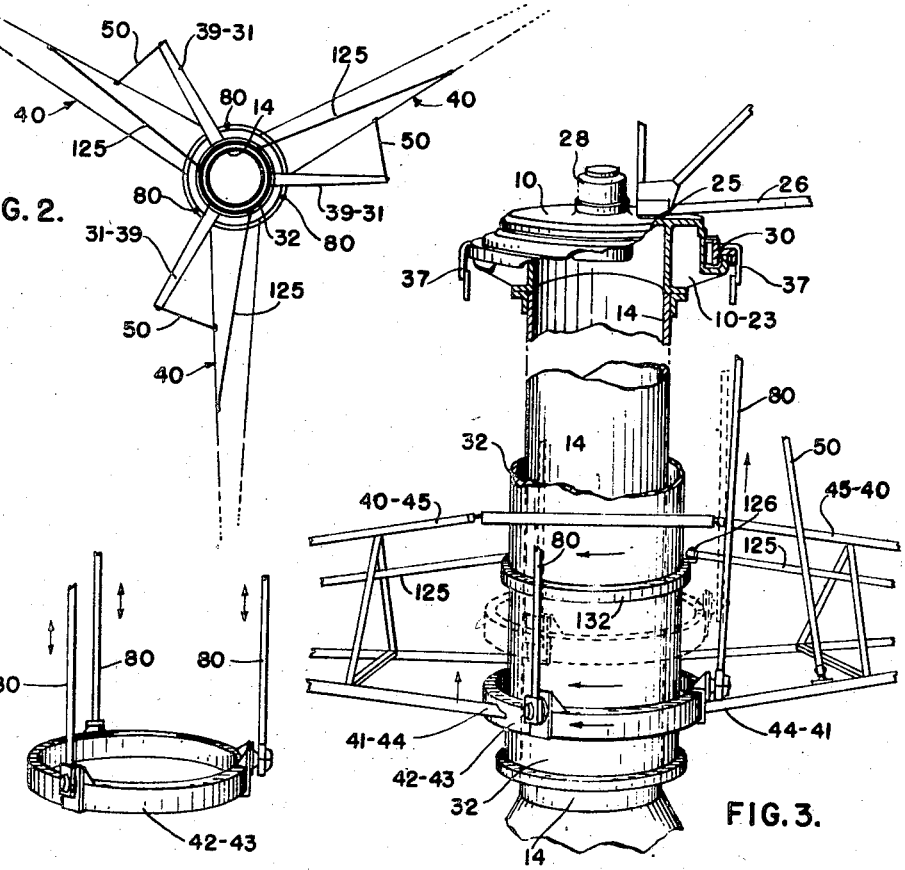
FIG. 4.  FIG. 3.
INVENTOR:
CHARLES HAROLD SCOTT,
BY
Arthur Middleton
ATTORNEY June 19, 1951     C. H. SCOTT     2,557,316
SETTLER Filed May 18, 1949     11 Sheets-Sheet 2

INVENTOR:
CHARLES HAROLD SCOTT,
BY
ATTORNEY

June 19, 1951 — C. H. SCOTT — 2,557,316
SETTLER

Filed May 18, 1949 — 11 Sheets-Sheet 3

INVENTOR:
CHARLES HAROLD SCOTT,
BY
ATTORNEY

June 19, 1951 C. H. SCOTT 2,557,316
SETTLER

Filed May 18, 1949 11 Sheets-Sheet 4

INVENTOR:
CHARLES HAROLD SCOTT,
BY
Anton Middleton
ATTORNEY

June 19, 1951 C. H. SCOTT 2,557,316
SETTLER
Filed May 18, 1949 11 Sheets-Sheet 5
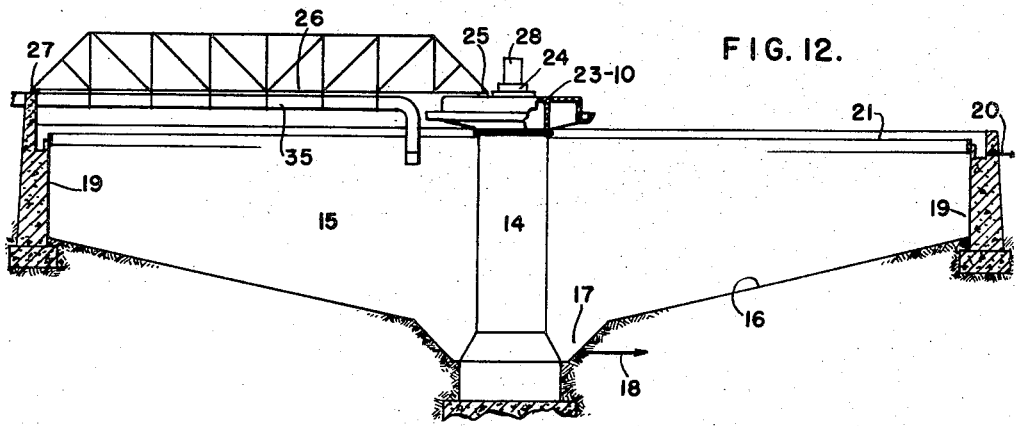
FIG. 12.
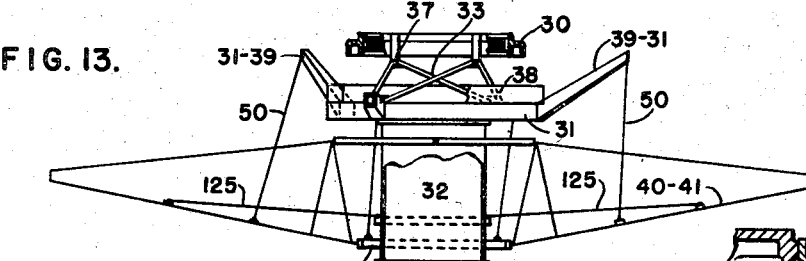
FIG. 13.
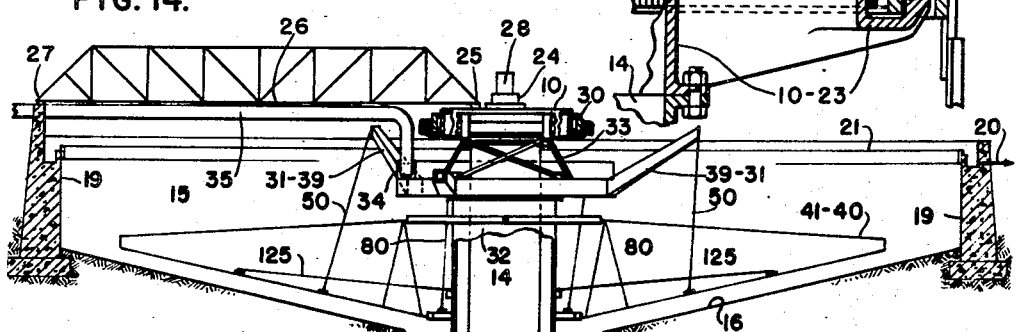
FIG. 14.
FIG. 15.
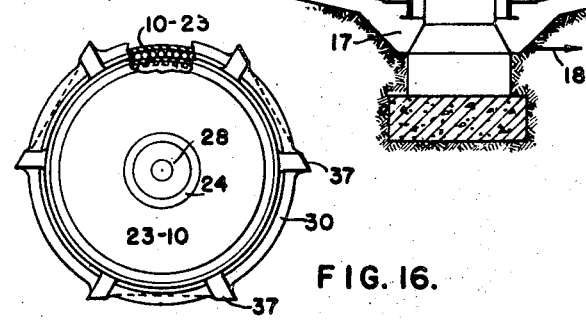
FIG. 16.
INVENTOR:
CHARLES HAROLD SCOTT,
BY
ATTORNEY

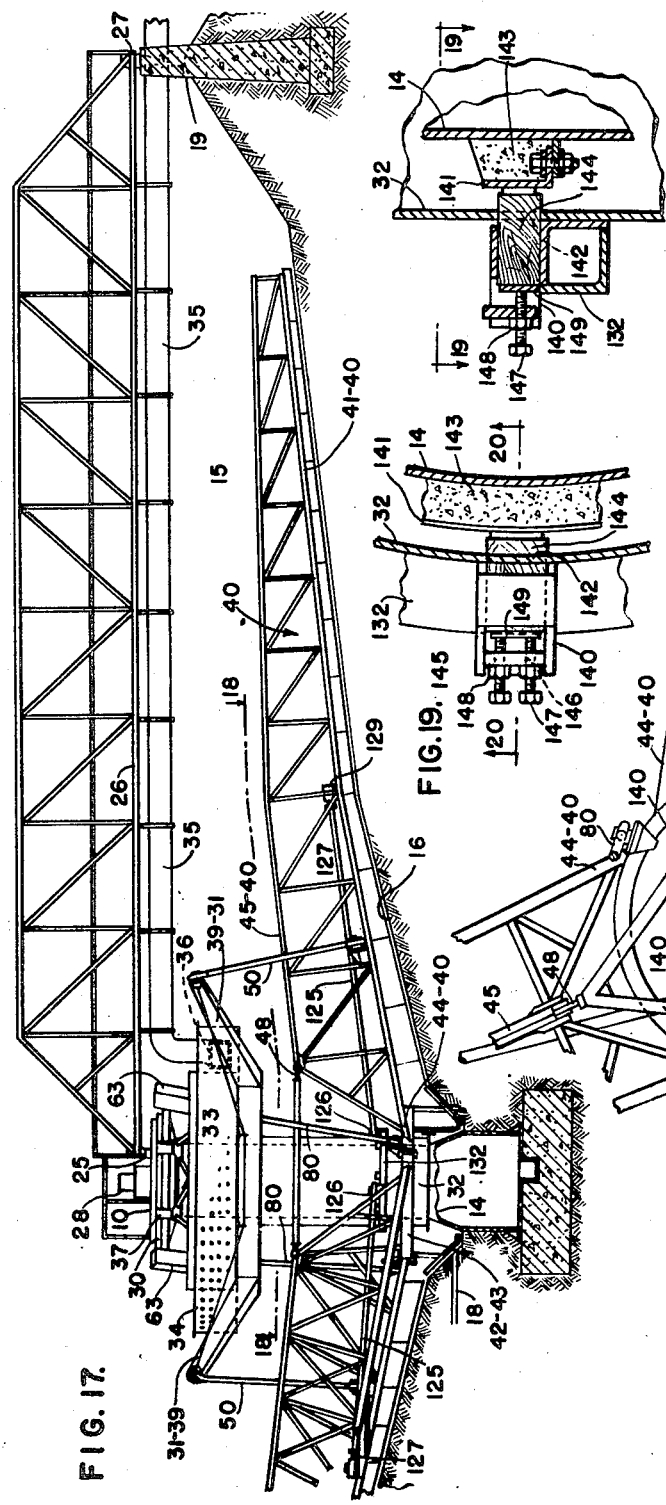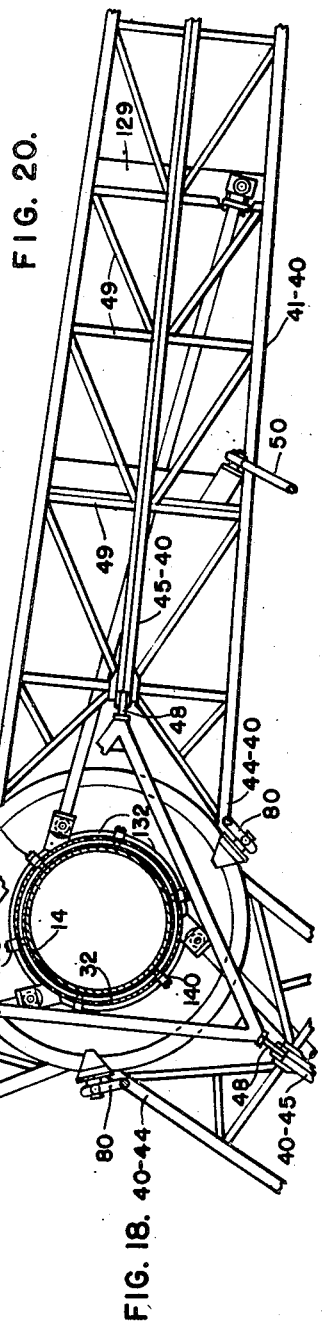

June 19, 1951 C. H. SCOTT 2,557,316
SETTLER

Filed May 18, 1949 11 Sheets-Sheet 8

INVENTOR:
CHARLES HAROLD SCOTT,
BY
ATTORNEY

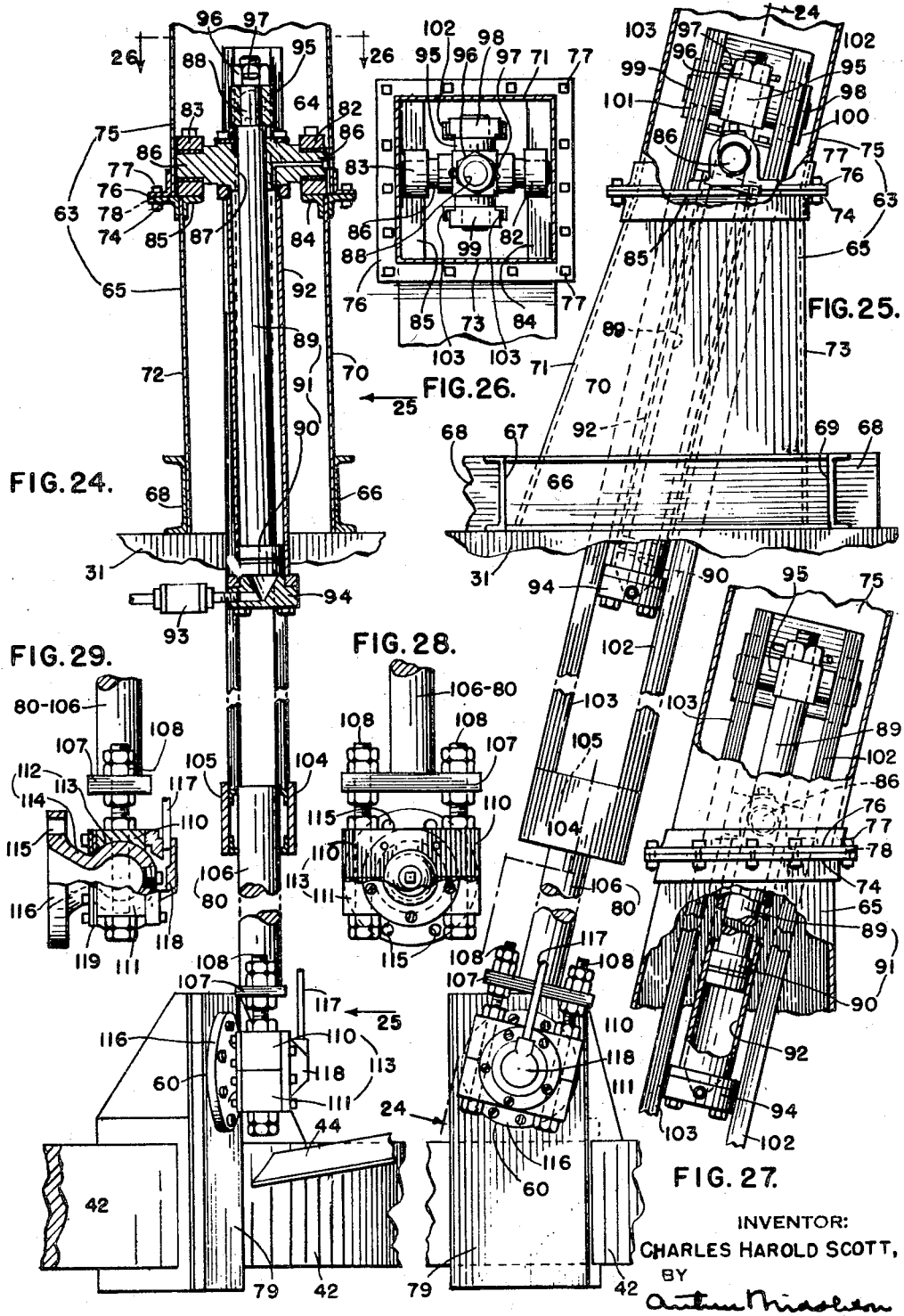

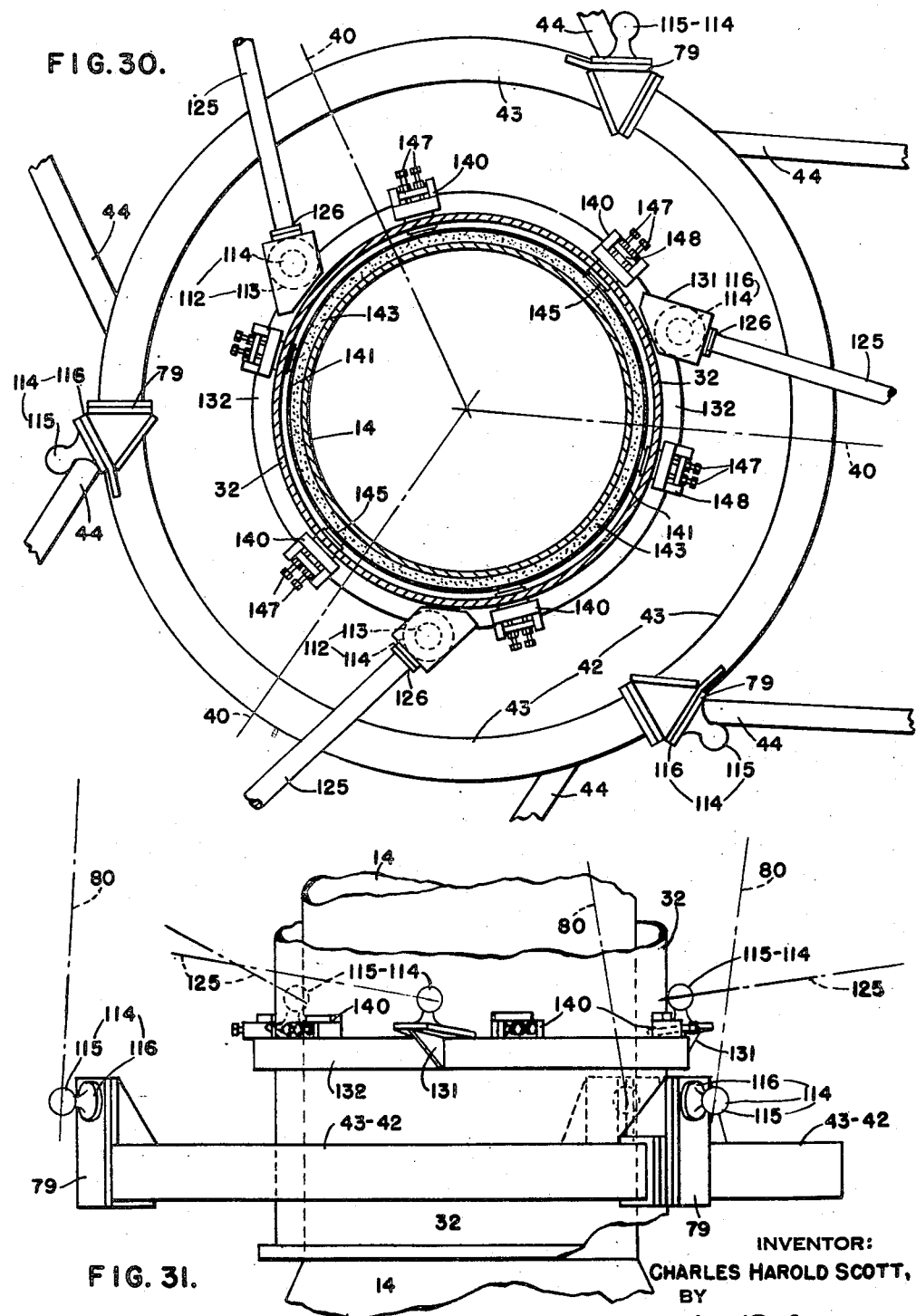

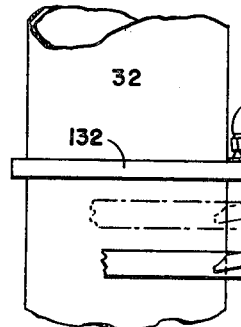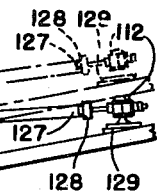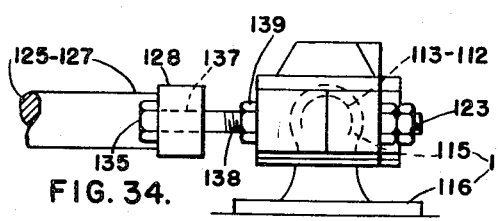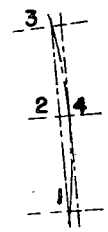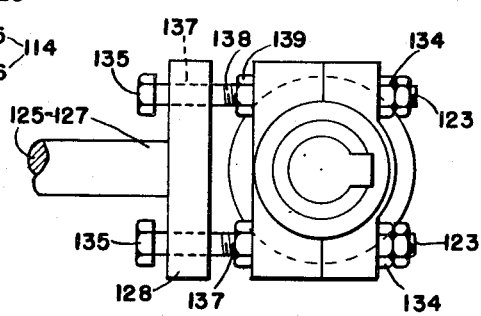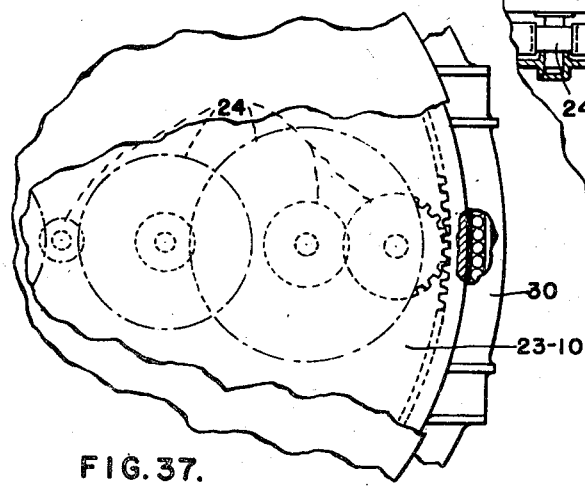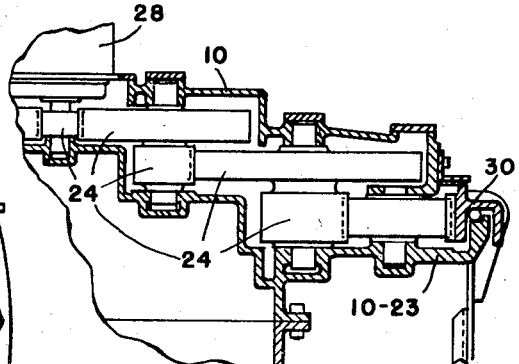

Patented June 19, 1951

2,557,316

UNITED STATES PATENT OFFICE 2,557,316

SETTLER

Charles Harold Scott, Westport, Conn., assignor to The Dorr Company, Stamford, Conn., a corporation of Delaware Application May 18, 1949, Serial No. 93,881

19 Claims. (Cl. 210—55)

The invention relates to mechanically-cleaned settling or sedimentation tanks or basins often called thickeners, hydroseparators, clarifiers, or settlers from which passes a clarified overflow and an underflow of thickened sediment. More particularly, the invention relates to sediment-raking and transferring mechanism for raking settled solids from diverse sections of the settler bottom progressively to a sediment-receiving central sump from which they may be passed to discharge as thickened mud.

In such existing sedimentation tanks, the sediment-raking blades are often rotated in annular paths over a bottom of the settler by means of radially-extending rake-carrying arms and these arms are rotated from a driven element generally at the center of the settler from a motor that is located above the liquid suspension being treated in the settler. In the larger size settlers the rake rams extend from a cylindrical or cage-like construction operating about a vertical axis. The cylinder encircles a fixed pier upstanding from the bottom of the settler whose top supports the motor for driving the cylindrical member and its raking arms. When these rotating rake arms encounter an overload of sediment, they will either become damaged or the driving mechanism will become unduly overloaded so arrangements are usually made whereby when the rakes encounter abnormal overload, the rake-carrying arms while continuing to rotate, are lifted vertically away from the settler bottom.

In present large size settlers, the rake-carrying arms instead of being a simple arm as in smaller size settlers, are usually made triangular in cross section with the apex of the triangle being uppermost. These triangular arms have to be fastened to the rotatable cylinder that encircles the fixed pier in a manner that is strong enough to resist any torque conveyed by the arms to the carrier, as otherwise there is a tendency for the arms to be unduly strained. It is an object of this invention to devise better means for lifting the rake-carrying arms while still permitting the arms to rotate.

To this end, this invention proposes a unitary tri-armed bladed rake-structure whose arms extend radially in the settler but whose support is provided by a tri-armed spider located above the liquid level and rotated by the motor on the pier with a pull-rod connecting each arm of the spider with each rake arm by suitable pivoted connections whereby rotation of the spider pulls the rake arms about a vertical axis irrespective of the elevation of the tri-armed rake structure. Then there must be means for lifting the rake structure by means which operate irrespective of the rotation of the spider and the rake-structure pulled around thereby. These means include a liftable ring that encircles the pier and supports the rake-structure. The ring in turn is dependingly supported from the rotatable spider by lift-rods whose vertical movement is controlled by hydraulic cylinders on the spider.

And finally, since the vertical adjustment (raising and lowering) of the ring and its rake-structure as a unit is independent of the rotating mechanism for the rake structure, there must be some means provided to control not only the centering but the lower limit of the rake-structure during the operation thereon of the two independent actions of rotation and of vertical adjustment. Therefore, the invention resides not only in the broader aspects just presented but in details of construction of these various means as will be described here following:

More particularly, the raking mechanism is designed for support on and for turnable movement about a fixed central support that is at an elevation higher than that of the normal operative liquid-level of the liquid-solids suspension undergoing sedimentation within the settler. Supported and fixed on this support is a bearing member for supporting a driven rotatable carrier. The carrier is actuated fom a power motor for turning the carrier about a vertical axis. Having rigid connection to the carrier and rotatable unitarily therewith is a tri-armed spider provided with a depending cylinder surrounding the pier and reaching into the lower portion of the basin.

The raking mechanism includes as an important functioning part thereof a tri-armed rake-structure whose lower central section includes a ring normally under compression from which there extend outwardly the lower chords of three-rake-arms which in plan are symmetrically arranged. The upper central section of this structure includes an encircling member which may be a triangle or ring from which extend outwardly the upper chords of the rake-carrying structure. Each rake arm of this structure is triangular in cross-section with the apex of the triangle at the top so each has an upper apex chord and two lower chords connected together to provide a relatively rigid rake arm. The several upper chords of the arms are connected under tension to the upper central section while the several lower chords are connected under compression to the lower central section thereby completing a tri-armed rake-structure having raking blades depending from the bottom thereof. The tri-armed structure is positioned above the floor of the basin and encircles the depending cylinder in a manner so that the tri-armed structure can either be raised or lowered relative to the cylinder as well as relative to the floor.

The tri-armed rake structure is both supported and actuated independently of the cylinder through the medium of a pull-rod for each arm of the structure whose upper end is pivotally connected to one of the arms of the tri-armed spider. Each pull-rod extends downwardly and rearwardly from an arm of the spider with its lower end being pivotally connected to an intermediate portion of one of the arms of the rake-carrying structure.

The raking mechanism also includes for each arm a descending non-extensible but functionally shortenable stop-rod carried by gimbal supports mounted on the tri-armed spider. Each stop-rod extends downwardly and forwardly with the low end thereof pivotally connected to the rake-structure and preferably to the compression ring to which the rake arms are secured. The raking mechanism also includes for each arm a centering rod pivotally connected at its inner end to a stiffening ring fixed to and surrounding a lower portion of the cylinder that encircles the pier and depends from the rotatable carrier on the pier. Each centering-rod extends in a general outward direction to a locality whereat its outer end is pivotally connected to a portion of its rake-arm outlying the locations whereat the pull-rods are connected to their rake-arms.

Operationally, it will be noted that as the carrier is motor-driven in a forward turnable direction, the pull-rods function to impart forward turning movement to the rake-structure in low raking position during normal raking loads and that the stop-rods determine what is the low normal raking position for the rake structure and function as low stop supports for the latter.

However, upon encountering abnormal overload conditions the downward rearward sloping pull-rods function to raise the rake-structure as the lifting of vertical components of the pulling forces exerted by the pull-rods become sufficiently great to accomplish that end, but that the rake-structure will gradually lower towards and into its low raking position as and when the abnormally heavy raking load is overcome or removed. In this way, an automatic safety mechanism is provided for dealing effectively with excessive overloads.

For understanding and exemplification of the invention reference is made to the drawings constituting a part of this specification in which two forms of the invention are illustrated. One form is a diagrammatic showing and is illustrated by Figs. 1 to 4 inclusive whereas the other shows a preferred form embodiment of the invention and is illustrated by Figs. 5 to 38 inclusive.

Respecting the figures generally relating to the diagrammatic form: Fig. 1 is a vertical section diagrammatically illustrating a settling basin equipped with a sediment-raking mechanism embodying the invention hereof. Fig. 2 is a sectional view of Fig. 1. Fig. 3 is an enlarged partial sectional view of the parts in the region of the centerpier of Fig. 1 and Fig. 4 is a detail of the lift-rod connections of the rake-structure.

Respecting the figures particularly relating to the preferred form: Fig. 5 is a plan view and Figs. 6 and 7 are vertical views taken as on vertical planes indicated by the broken lines 6—7 of Fig. 5 looking in the direction of the arrows, the difference between Figs. 6 and 7 being that in Fig. 6 the rake-arms are in low normal raking position, while in Fig. 7 the rake-arms are in elevated positions when encountering abnormally excessive raking overload conditions. In Figs. 5, 6 and 7 the several parts are shown for the position they occupy when the full-line rake-arm is at location "X." As to Figs. 8 and 9 the former is a plan view and the latter is a vertical view taken as on vertical planes indicated by the broken line 9—9 of Fig. 8 looking in the direction of the arrows. In this position the full line rake-arm has been moved 120 degrees from "X" to "Y." As to Figs. 10 and 11, the former is a plan view and the latter is a vertical view taken as on vertical planes indicated by the broken line 11—11 of Fig. 10 looking in the direction of the arrows. In this position the full line rake-arm has moved 120 degrees from "Y" to "Z." From Z the full line rake-arm ultimately moves to 120 degrees of the original full line position X. Fig. 12 indicates in vertical cross-section a settling basin with a rising central pier supporting a fixed central support bearing of a drive-head. Fig. 13 indicates how the raking mechanism of Figs. 5 to 11 inclusive derive support from the driven carrier as exemplified by a bull-gear that is received upon and turnably supported with respect to the fixed central bearing and which driven carrier or bull-gear constitutes a motor actuating member of the drive-head. Fig. 14 shows the driven carrier or bull-gear in place on the fixed bearing and thusly the mode of support of the raking mechanism within and with respect to the basin. Figs. 12 and 14 also show the manner of support of the trussed bridge or walkway as to its outer end by a marginal wall of the basin and as to its inner end by a stationary casing portion of the drive-head. These figures also show a feed pipe that receives support from the bridge. Figs. 15 and 16 are partial detail views respectively showing in vertical section and in plan how the bull-gear is supported through the medium of anti-friction bearing members disposed in raceway bearings provided on the fixed central bearing member and engaged by raceway bearings at the underside of the bull-gear.

Figs. 5 to 16 are diagrammatic showings whereas the following are not. Figs. 17 and 18 are respectively vertical and plan partial views showing in greater detail the raking mechanism with associated functioning parts thereof and more particularly a set of pull-rods as 50, a set of lift-rods as 80, and a set of centering-rods as 125. Fig. 18 is a sectional view taken as on plane indicated by the broken dot and dash line of 18—18 of Fig. 17 looking in the direction indicated by the arrows. Figs. 19 and 20 are respectively horizontal and vertical partial sectional detail views of a steady bearing construction. Fig. 19 is a horizontal view taken on the plane indicated by dot and dash line 19—19 looking in the direction of the arrows and Fig. 20 is a vertical view taken on the plane indicated by the dot and dash line 20—20 of Fig. 19 looking in the direction of the arrows. Figs. 21, 22 and 23 are partial views at a larger scale than that employed in Figs. 18 and 19. Fig. 21 is a vertical view while Figs. 22 and 23 respectively show in plan and elevation with parts being broken away, the tri-armed spider.

Figs. 24 to 29 inclusive are views showing in detail the construction of the lifting rods, their mode of connection to and supported upon a tri-armed spider of Figs. 21, 22 and 23, and of the pivotal connections provided at the lower ends thereof to the low central portion or low compression ring of the raisable rake-structures of Figs. 17, 18 and 21. Figs. 30 and 31 are partial views employed to show details whereby there are provided three sets of pivotal connections, one set for the lower ends of three pull-rods as 50, one set for the lower ends of the three lift-rods as 80, and one set for the inner ends of three centering-rods as 125. Fig. 32 is a vertical view indicated a centering-rod and its mode of connection to a lower end of a depending cylinder that surrounds a centerpier and which cylinder is not liftable while the outer end of the centering-rod is indicated as connected to an outlying portion of a bladed rake-carrying arm of the rake-structure the latter of which is not raisable. In this figure there is indicated by full lines the normal position of the centering-rods and of the rake-structure for normal raking load conditions while by the dot and dash lines there is indicated the position of the parts just referred to when the rake-structure is raised due to encountering abnormally excessive raking load conditions. Fig. 33 is a view employed to explain why a foreshortening construction for centering-rod is provided. Fig. 34 and Figs. 35 and 36 are views respectively showing details of construction of the outer end portions of the centering-rods and indicate the construction whereby the centering-rods are foreshortenable. Fig. 35 indicates the position which the outer socket end members of the centering-rods assume relative to the rods as and when the rake-structure is neither in its full lower position nor in the dotted line raised position of Fig. 32. In Fig. 36 there is indicated the position of a socket construction relative to the rod when the rod is in transit between the extreme high and low position therefor. Figs. 37 and 38 respectively provide a partial plan view of which certain parts have been broken away and a vertical sectional view illustrative of a motivated power-transmission and speed-reducing gearing that is provided in and constituting part of the drive-head whereby from a motor carried on a stationary portion of the drive-head there is imparted slow but powerful driving force to the bull-gear through the medium of the speed-reducing gearing.

Reference is now made to the drawings in detail:

*Diagrammatic and preferred embodiments*

By the drawings there is illustrated a settler basin 15 having earth or other material providing a bottom whose general surface slants downwardly and inwardly to provide a sloping floor 16 leading to a central depressed portion or sump 17 for receiving sedimented material or mud impelled thereinto by a tri-armed rake-structure 40 having blade-carrying rake-arms 41 constituting a part thereof. A sediment or mud-discharge line 18 leads from said sump. The basin has a suitably constructed marginal wall 19 rising from the bottom and also has an outflow means 20 providing an effluent launder overflow weir 21 that determines the normal operative surface level of a body of liquid-solids mixture undergoing sedimentation or quiescent settling within the settler. A pier 14 rising from the depressed central sump 17 reaches to an elevation higher than that of the normal surface level of the liquid within the settler basin, to wit, as determined by the overflow weir 21 of the effluent launder. Pier 14 typifies a form of support by which a drive-head 10 of already known type is supported. The pier receives and has secured thereto a central support bearing 23 constituting a base member of the drive-head 10. The support bearing is at elevation substantially higher than that of the surface level of the liquid. The support bearing 23 has mounted thereupon the driven carrier 30 which may be in the form of or provided by an internal toothed bull-gear that is turnably driven by the motor actuated speed-reducing and transmission gearing generally designated 24 and located within the drive-head 10 whereby the driven carrier 30 has turning movement about a vertical axis concentric with that of the central support bearing 23. The drive-head 10 and the motor-actuated speed-reducing and transmission gearing 24 just referred to is exemplified by Figs. 37 and 38 hereof. The drive-head as constructed also includes a cover or top casing member that provides support for the inner end 25 of a trussed bridge or walkway 26 of which the outer end 27 derives support from the marginal wall 19. The drive-head also provides support for motor 28 which is employed for imparting driving movement to the speed-reducing and power-transmission means 24 and thusly to the driven carrier or the bull-gear 30.

*Carrier 30 drives spider 31 and cylinder 32*

In connection with the driven carrier 30 it is here noted that there are sets of inverted V-shaped members 33 of which the upper ends are directly connected at 37 to the carrier or bull-gear so that they collectively function as intermediate hanger members from which there are supported and turnably carried the tri-armed spider 31 and the depending cylinder 32. The lower ends of the inverted V-shaped members 33 are connected as at 38 to the tri-armed spider 31, or as more specifically stated to upstanding tabs or connecting members of the same number which are provided on and as part of the spider 31. The spider 31 and the depending cylinder 32 may thusly be viewed as carried directly from and turnably driven by the carrier or bull-gear 30. The walkway 26 also supports a feed pipe or conduit 35 having a descending inner discharge end 36 arranged for passing feed material from a region outside of the tank into an annular type of central feed-distributing well 34 hereinafter referred to.

The foregoing sets forth the environment in which the raking mechanism embodying the invention hereof is employed.

*Tri-armed raking mechanism*

There are now listed certain parts of the raking mechanism constituting the invention hereof which is carried from the driven carrier or bull-gear and so as to be turnable therewith.

This invention includes the tri-armed spider 31 and depending cylinder 32 that are secured so as to function as a unit turnably supported by and from the carrier bull-gear 30. Carrier 30, spider 31 and the cylinder or cake 32, as the latter may be called, function at constant elevation and are not liftable. In addition to these non-liftable turnable members 30, 31 and 32, the new raking mechanism includes an elevatable tri-armed rake-structure collectively designated 40.

Tri-armed rake-structure 40

This rake-structure 40 is actuated for forward turning raking movement through the medium of pull-rods 50, is supported in low raking position by lift-rods 80 functioning as low stop-rods and is maintained in concentric position with respect to the depending cylinder 32 through the medium of centering-rods 125. During the normal raking load conditions the rake-structure occupies its low operative position with respect to the floor 16 where it functions to rake and impel sedimented solids forwardly and inwardly into the central sump 17 from which conveyed solids can be passed as mud from the basin.

Three unlike sets of rods, there being three like rods in each rod set

It has been mentioned that this tri-armed rake-mechanism is provided with (a) means constructed for actuating the rake-structure 40 in low position therefor and for automatically raising the rake-structure to elevated position upon the encountering of excessively heavy abnormal raking load conditions by the rakes thereof, (b) means for arresting downward movement and for serving to support the rake-structure in a normal low operating position, and (c) for ensuring continuous concentricity as between the rake-structure on the one hand and the axial center of the raking mechanism as a whole on the other hand. The several means just mentioned have previously been referred to and include respectively (1) a set of three pull-rods 50, (2) a set of three lift-rods 80 which are sometimes referred to as low-positioned stop-rods, and (3) a set of three centering-rods 125. The rods of each of these sets have symmetrical arrangement about a vertical axis of the turnable carrier and this means that the rods of any one set have symmetrical arrangement with respect to each other.

As to the pull-rods 50 the upper end 51 of each is pivotally connected to the outer upper end of a spider arm 39 corresponding thereto. Each pull-rod slants downwardly and rearwardly from the arm portion of the spider. The lower end 52 of each pull-rod is pivotally connected to a corresponding rake-arm portion of the rake-structure.

As to the lift-rods 80 each is non-extensible and therefore can function as a rod of determined maximum length and so that as a set they can function as low stop-rods that serve to stop or arrest the rake-structure in a downward movement and to support the rake-structure in its low raking position. As installed for functioning as lift-rods, each is constructed so as to embody means for temporarily shortening its length thereof and for later permitting its length to be restored to its predetermined normal length beyond which it is non-extensible. The upper end 61 of each lift-rod 80 derives pivotal support—a gimbal support—from the tri-armed spider 31, or as otherwise expressed, through the medium of a housing secured to and rising from the spider and by which housing the upper pivotal or gimbal support is carried. Each lift-rod 80 preferably slants downwardly and forwardly and the lower end thereof is pivotally connected as at 62 to a low central ring 42 of the rake-structure 40.

As to the centering-rods 125, the inner end 126 of each is pivotally connected to a reinforcing ring 132 that is fixedly secured to a lower end portion of the non-liftable depending cylinder 32. Each centering-rod extends in a general outward direction and the outer end 127 thereof has a pivotal connection to a low forward portion of a corresponding rake-arm 41 of the rake-structure 40. The centering-rods are relatively taut particularly when the rake-structure is in either a low normal raking position or when the latter is in its uppermost raised position.

In Fig. 3 there is diagrammatically indicated the inner ends of two of three rake-arms 41 of the tri-armed rake-structure 40. Each rake-structure has a low central section 42 provided by three segments 43 which when assembled and connected together provide a heavy compression ring against which there abuts and to which there are connected a lower pair of chords 44—44 of each rake-arm 41. The three rake-arms 41 are in plan symmetrically arranged. Each rake-structure 40 also includes an upper central member 45 which functions as an upper tension member. The upper central member 45 in plan is preferably in the form of an open center triangle; it may be circular in form and it functions under tension. This upper tension member and also the lower circular compression ring each surrounds but is spaced from a lower portion of the turnably driven depending cylinder 32. Each rake-arm in vertical transverse cross-section is preferably in the form of a triangle. The lower chords 44—44 of each arm that abuts and presses against the low circular compression ring may be viewed as compression members. The upper chord 46 of each arm may be viewed as a tension member of which the inner end is secured by a connector member 48 to a portion of the upper tension ring or triangular tension member 45 through the medium of the connection member at 48. As to this see the connector 48 in Figs. 17, 18 and 21. The two lower chords 44 and the upper chord 45 have an A form arrangement whereby a cross-section of the rake-arm indicates the form of a triangle of which the several chords are tied together by plates or angles such as 49 into a relatively rigid skeleton-type of structure.

Because of this particular construction above described it will be appreciated that the rake-structure can be raised from lower raking position and subsequently lowered back into set position and at the same time it can always be maintained in proper operative position with respect to the other parts of the raking mechanism as a whole. The pull-rods which slant downwardly and rearwardly as they function serve to pull the tri-armed rake-structure in a general forward direction. They also exert upward pulling forces which when sufficiently great, as when abnormally heavy overload raking conditions are encountered, serve to progressively and effectively raise the rake-structure 40 and to hold it in raised or elevated position until the overload conditions have been lessened or overcome.

Mention has heretofore been made that the non-extensible lift-rods 80 preferably embody some type of means for functionally foreshortening the same, this whereby at the will of an operator the rake-structure 40 can be raised as and when desired. The construction of the lift-rods 80 and their mode of installation will later be described in detail.

Tri-armed spider 31

The tri-armed spider 31 as constructed has a horizontally-extending body portion 53 having a marginal construction in the form of an equilateral triangle from the apexes of which there are outwardly- and upwardly-extending arms 39 of equal length. These arms respectively align with a vertical plane extending from the center of the triangle corresponding to the particular arm. This much is manifest from an inspection of the drawings. The spider, however, is shown in detail in Figs. 22 and 23 and certain structural features thereof are amplified by the showing in Fig. 21. From the figures just mentioned it will be noted that the body-providing portion 53 thereof has three main members that embody and provide the upwardly- and outwardly-extending arms 39 and inwardly-extending pairs of forked horizontal members 54 that diverge from each other so as to have a spread of 60 angular degrees relative to each other. The inner spaced ends of these diverging fork members are provided with flanges 55 extending at right angles thereto and when assembled as shown adjacent flanges are firmly connected as by bolting, welding, or otherwise whereby to provide a rigid structural formation constituting the horizontal triangular body 53 referred to.

Between the fork arms 54 of each of three main members there is interposed a fixed horizontal strut or tie member 56. To the construction provided by the three members 56 thereof is secured and supported a circular flanged ring 57 which in turn is also secured in any suitable manner to the depending cylinder 32 and whereby the depending cylinder is supported so that the center thereof is in vertical alignment with the center of the triangular body.

The spider also has struts 58 extending outwardly and horizontally from the several forked members 54. The struts 58 serve as cantilever members or braces and are forcibly engaged by the turn-buckle tie rods 11 which function under tension. These cantilever members or struts 58 are provided for maintaining in position a low portion of the tie rod members 11, the latter of which are adjustable as to length or tension by the turnbuckle 12 embodied in each. Each tie rod 11 functions and extends between the outer ends of the two outwardly-extending spider arms 39 corresponding thereto. These three tie rods as thus embodied serve to serially connect the outer ends of the arms 39 and thereby serve to act as strong connecting members whereby the spider 31 can transmit equal torsional force therethrough and thusly equal pulling forces to the pull-rods 50 and ultimately to tri-armed rake-structure 40.

The spider is also provided with six upstanding tabs 38 to which are fixedly secured to the lower ends of the inverted V-shaped intermediate hangers 33, thusly there is completed the carrier construction for the spider 31 and the cylinder 32, which it will be noted is connected to the spider in a manner whereby the center of the triangular body portion of the spider and the center of the descending cylinder 32 are in alignment with the axial center of the carrier 30. This spider serves (a) to support the pull-rods 50 from the outer ends of the upwardly-extending arms 39 thereof, and (b) to support three lift-rod housings 63 from the horizontally-extending body portion 53.

Pull-rods 50

It is here pointed out that the pull-rods 50 are three in number, that they are symmetrically arranged about the vertical axial line and that the upper end 51 of each is connected to the upper outer end of a corresponding spider arm 39 through the medium of a ball and socket construction hereinafter described and that the lower end 52 of each pull-rod is also connected through the medium of a ball and socket connection to a low forward portion of a rake-arm of a corresponding rake-carrying arm 41 of the tri-armed rake-structure 40. These pull-rods slope downwardly and rearwardly in a counter-clockwise direction.

Tri-armed spider 31 and lift-rod housing 63

Three lift-rod housings 63 are assembled in symmetrical arrangement and secured in place on the body portion 53 of the tri-armed spider. Each is provided for receiving and carrying a gimbal support 64 for the upper end of a non-extensible but functionally shortenable lift-rod 80 corresponding thereto; there are three lift-rods. They have symmetrical arrangement about the central axial line and are later described in detail.

Said housings 63 function as enclosing casings and are fixedly connected to and are located near the apex portions of the horizontally-extending body 53 of the spider. The housings 63 extend upwardly from said body portion 53 and as shown slant outwardly and rearwardly. The location of these housings 63 is clearly shown in Figs. 21, 22 and 23. The housing 63 is shown in greater detail in Figs. 24 and 25.

The housing 63 comprises a low upwardly tapering section 65 and an upper box-like section 75. The lower section has parallel side plates 70 and 72 and front and rear plates 71 and 73 and is marginally topped with flanged members 74 providing an upwardly disposed horizontal flange extending outwardly. This flange 74 is provided for receiving an outwardly-extending flange of marginally flanged end 76 at the lower portion of the upper housing section 75.

The means for fixedly securing the housing 63 to the spider includes three sets of four horizontal members 66, 67, 68 and 69 (see Fig. 22). The four horizontal members just referred to are supported on and connected to the fork portion 54 of the spider near the apex thereof. Each set of four horizontal members defines a rectangular opening from which a gimbal supported lift-rod downwardly extends. The horizontal members of these sets serve as supports for and as connectors to which there is secured the lower upwardly tapering section 65 of the housing 63 that corresponds to the particular set of four horizontal members.

A comparison of Fig. 24 with Fig. 22 will disclose that the side plates 70 and 72 are the parts which are secured to the housing members 66 and 68. The housing 63 may be viewed as part of the mechanism that includes or provides the lift-rods 80. The low tapering housing section 65 includes besides the side plates 70 and 72 a front plate 71 that has a decided upward and rearward slant while a rear plate section 73 has at the most only a slight upward and rearward slant. The upper housing 75 is detachably secured to the lower tapering section 65 as through the medium of bolts 77 passing through bolt-hole openings 78 provided in and by the flanges 74 and 76.

It is also pointed out at this time that a set of horizontally-extending flanged angle irons 84 and 85 are provided at and are secured to the upper inner end portion of the side plates 70 and 72 as is indicated by the showing in Figs. 24 and 25.

Spider 31 and feedwell 34

Also in respect to the spider 31 it will be noted from an inspection of Figs. 1 and 17 and from the larger details of Figs. 21 and 23 inclusive that the feedwell 34 heretofore referred to is in the form of an annular basin or trough that is connected in any suitable manner in place on the horizontal body portion 53 of the spider. This connection is in a manner whereby a further degree of rigidity for the spider can be made available for the latter because of the annular formation of the feedwell and because of a firm connection of the feedwell to or as a structural part of the spider. This ascribes a structural function which can be accorded to the feedwell in addition to that of the normal function of receiving and distributing incoming mixed solids. The bottom and the outer side wall of the feedwell are both provided with numerous feed-distributing openings. The size of these openings is largely selected according to the size or type of the solids of the feed material delivered into the well for distribution thereby.

The significance of the above description with respect to the lift-rod housing 63 is apparent from an inspection of Figs. 21 to 26. It is now in order to describe in detail the construction and mode of installation of the lift-rods 80 which also function as a set of low stop supports for the liftable rake-structure 40 as and when the latter moves from an elevated position therefor downwardly into or when the rake-structure is at the low raking position therefor particularly when encountering raking loads that are not abnormally excessive above a normal raking load condition.

Lift-rods 80

For details of a lift-rod coming under this caption and for illustrating the mode of installing the same through the medium of a gimbal type of support carried by a housing 63 and the mode of connecting the low end of a lift-rod 80 to the rake-structure, reference is made to Figs. 24 to 31.

Of the figures just mentioned Fig. 24 is a view partially in section taken as on a plane indicated by the dot and dash line 24—24 of Fig. 25 looking in the direction of the arrows.

Fig. 25 is a view partially broken away looking at the structure of Fig. 24 in the direction of the arrow 25.

Fig. 26 is a sectional view taken as on the plane indicated by the dot and dash line 26—26 of Fig. 24 looking in the direction of the arrows.

Figure 5:
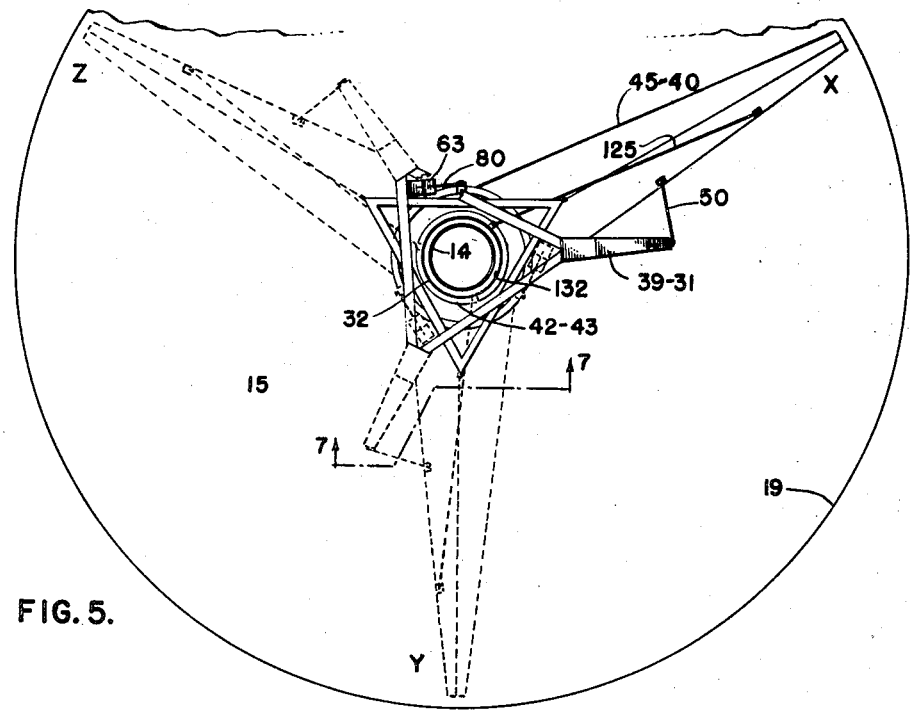
Figure 6:
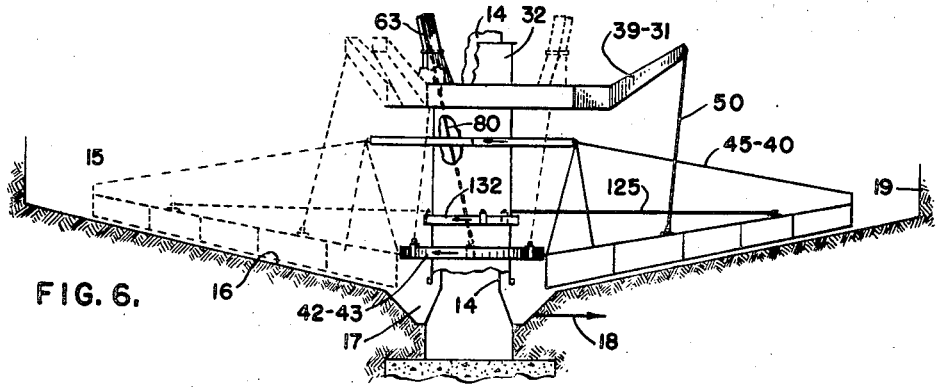
Figure 7:
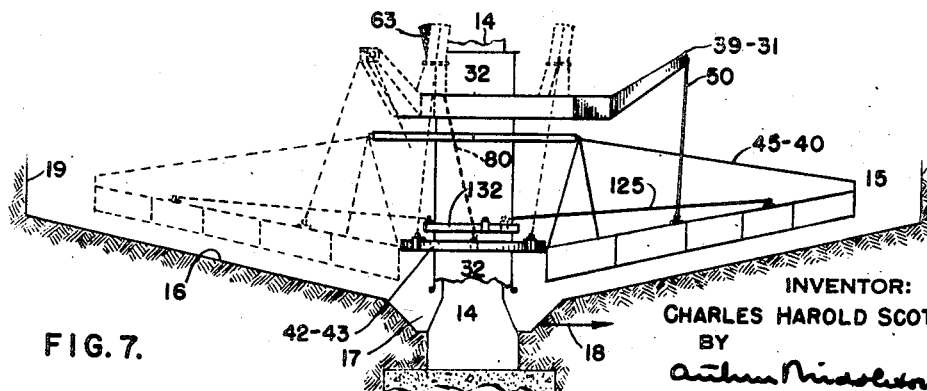
Figure 8:
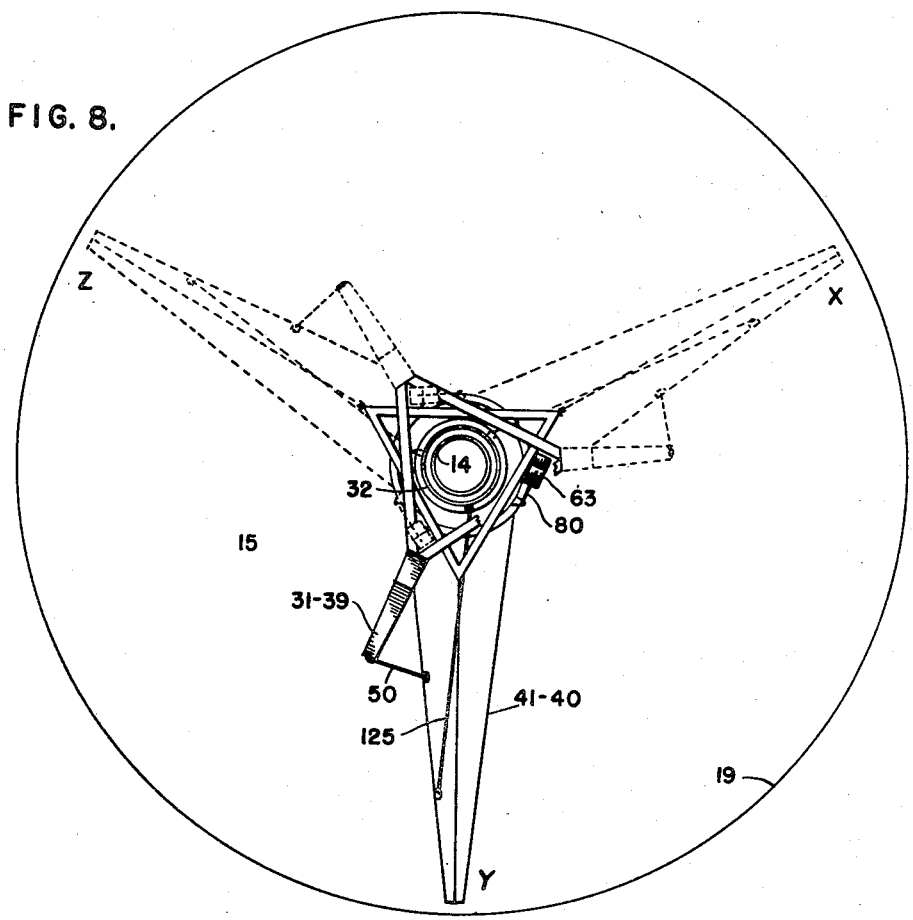
Figure 9:
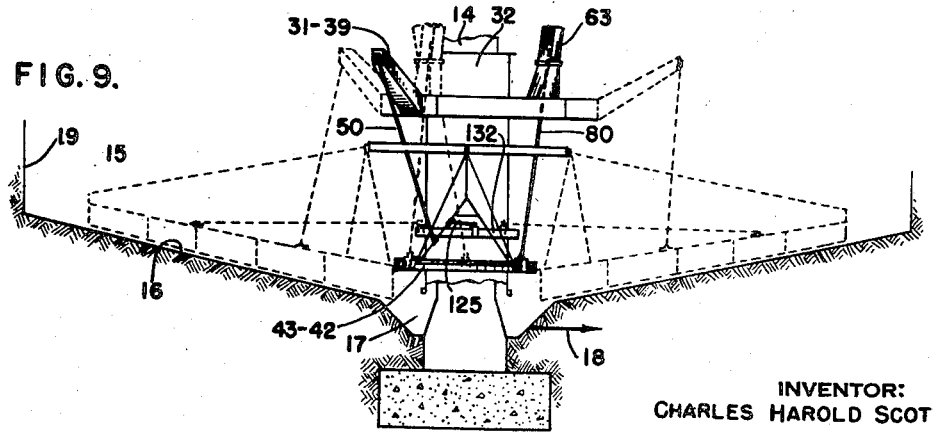
Figure 10:
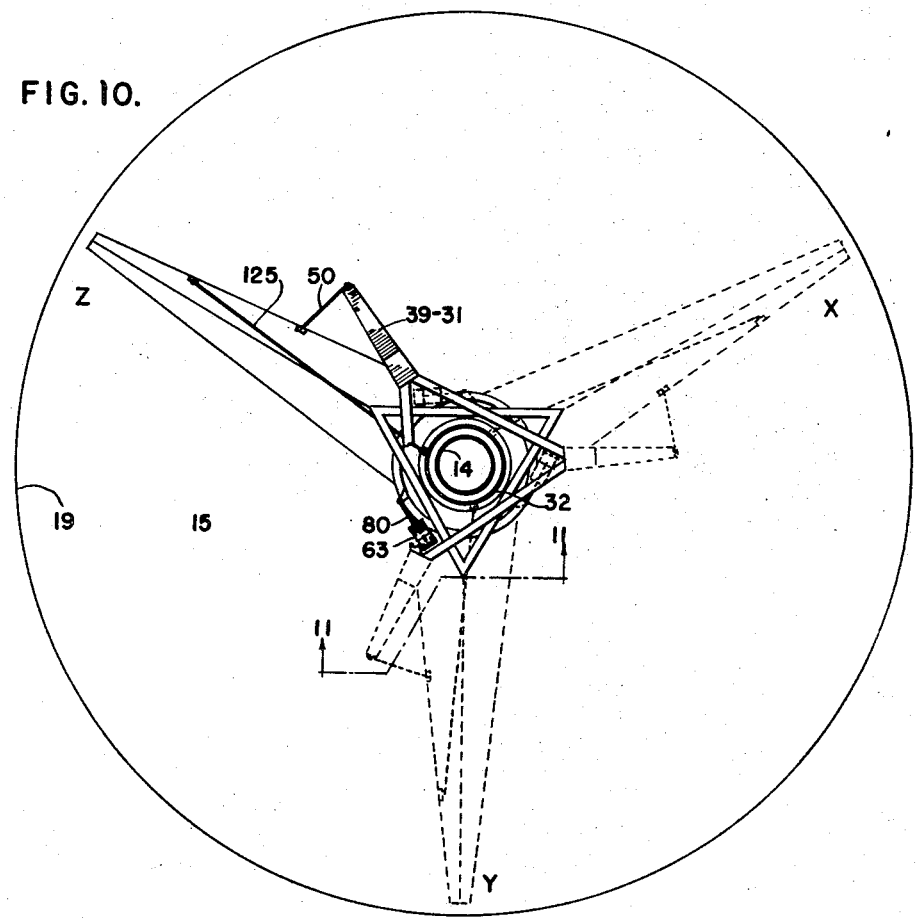
Figure 11:
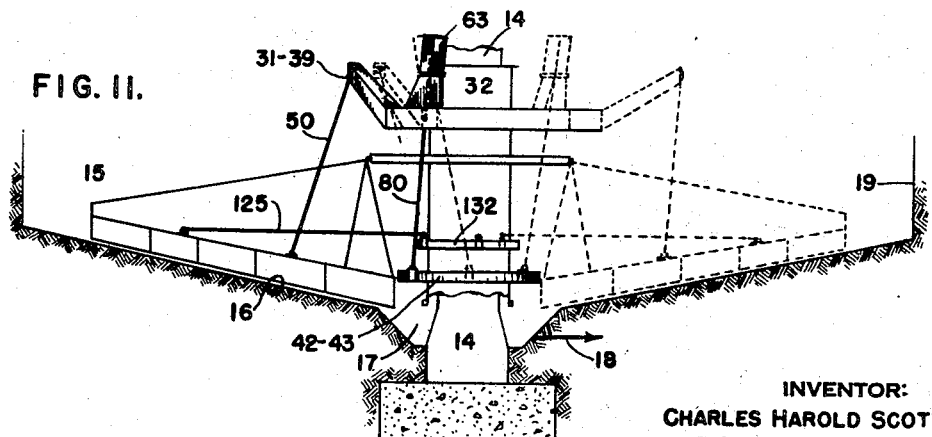

Fig. 27 is a partial view, part of which is shown broken away and in section looking directly at the upper portion of the structure shown in Fig. 25. In Fig. 25 the parts of a cylinder, of a liftable piston therein, and of certain parts of the lift-rod actuated by the latter are shown in the position which they occupy relative to each other when the lift-rod is at its full length or in low supporting position for the rake-structure.

In Fig. 27 the cylinder with liftable piston therein illustrates how the cylinder and the piston can function as a lift-rod foreshortening means when pressure liquid is delivered into the cylinder between the region above the low cylinder head and the low face of the piston head from which the piston rod rises and from the upper end of which piston rod a descending section of the lift-rod is pivotally supported in raised position therefor.

Figs. 28 and 29 show the ball and socket construction that serves as a pivotal connecting element between the low end of a lift-rod on the one hand and a short riser member 78 on the low central compression ring 42 of the liftable rake-structure 40 on the other hand.

Now reverting to the housing 63, it will be noted that a gimbal support 64 embodies side bearings 82 and 83 of constant elevation that are securely mounted on the inwardly-extending flange members 84 and 85 provided at and within the upper end of the low housing section 65. It will also be noted that a horizontally-extending pivotal shaft 86 of constant elevation is mounted in said side bearings 82 and 83. This pivotal shaft has a circular bored opening 87 through which there upwardly extends the upper shouldered end 88 of a piston rod 89 rising from a low piston head 90 of a vertically liftable piston 91 that is located within a depending cylinder 92 corresponding thereto. The upper end of the cylinder is secured to said pivot shaft 86 whereby the cylinder depends therefrom. The cylinder is disposed so that it is concentric with the circular opening 87 which is provided for receiving the piston rod 89. The pivot shaft functions not only as a support for the cylinder but also as an upper head for the cylinder in which the piston rod has guiding contact.

The cylinder 92 has detachably secured thereto at the lower end thereof a cylinder head 94 which receives pressure water supplied thereinto through the medium of a pressure supply line that includes a check valve 93. This check valve permits ready flow of pressure liquid into the cylinder into the region immediately above the cylinder head but below the piston head. The check valve is of a bleeder type construction which permits only a slow gradual release of pressure liquid from within the cylinder when the pressure supply is cut off.

Reverting now to the gimbal support 64, it will be noted that the upper end of the piston rod provides a shouldered portion from which there upwardly extends a reduced in diameter screw-threaded end portion. An upper cross-bar 95 is seated upon this shouldered end 88 and is secured in place thereat by a clamping nut 96 that is locked in clamping position by a split pin 97. The ends of this cross-bar 95 are provided with trunnions 98 and 99 that are received in bearing members 100 and 101 provided at the upper end of a set of descending transversely-spaced tension plates or rod members 102 and 103 between which the cylinder 92 is located. The lower ends of these plates or rod members 102 and 103 are secured between and rigidly connected together by a pair of lower outer cross-strips 104 and 105 to which there is in turn connected thereto the upper end of a descending lower lift-rod section 106 having a lowly-disposed cross member 107 for receiving a pair of bolts 108. These bolts because of a series of nuts on each provide positively secured but positionable adjustable members which in turn carry a pair of socket members 113 of a ball and socket construction generally designated as 112. The ball providing member of the construction 112 just referred to is designated as 114 and has a flanged body portion 116 provided with bolt-receiving openings 115 whereby the ball members may be secured at 60 as by bolts to a corresponding connecting member or section as 78, or as other expressed to that which constitutes a part of the low central compression ring 42 of the rake-structure 40.

It has heretofore been indicated that the lift-rods 80 are non-extensible but because of the particular cylinder and piston mechanism embodied therein they are functionally shortenable whereby the lower ends of the lifting rods can be raised particularly since the upper pivot shaft 85 that is pivotally supported at a constant elevation by the bearings 82 and 83 and from which pivot shaft 86 the cylinder 92 is dependingly carried therefrom. When the lift-rods 80 are in full length or non-extended position therefor either the piston head 90 must rest on the low cylinder head 94 or else the upper cross-bar 95 must directly or indirectly rest upon and be carried by the pivot shaft 86.

In the construction shown in Fig. 24, the piston 91 is in low position and the head thereof is seated on the low cylinder head whereby the support for each of the depending lift-rods 80 is derived from the pivot shaft 86 through the medium of the depending cylinder 92, the low cylinder head 94 thereof, the piston 91 and the cross-bar 95 which has trunnions 98 and 99 that are received in the bearings 100 and 101 corresponding thereto. From Fig. 25 it will be noted that the cylinder 92 and the other parts just enumerated are located at and between the upper set of the transversely spaced plates or rod members 102 and 103. The lift-rods 80 in effect include for the upper part thereof said pair of plate or rod members 102 and 103, the cross strips 104 and 105 and the lower lift-rod section 106 which has been described.

The construction thus referred to and which includes the pivot shaft 86 that is mounted in the side bearings 82 and 83 and the cross-bar 95 at the upper end of the piston head 86 and which in turn has trunnions 98 and 99 that enter in or support the bearings 100 and 101 at the upper end of the descending members of the lift-rod provide the gimbal support previously mentioned. The gimbal support thus provided affords a universal type swinging support for the lift-rod 80.

Figure 21:
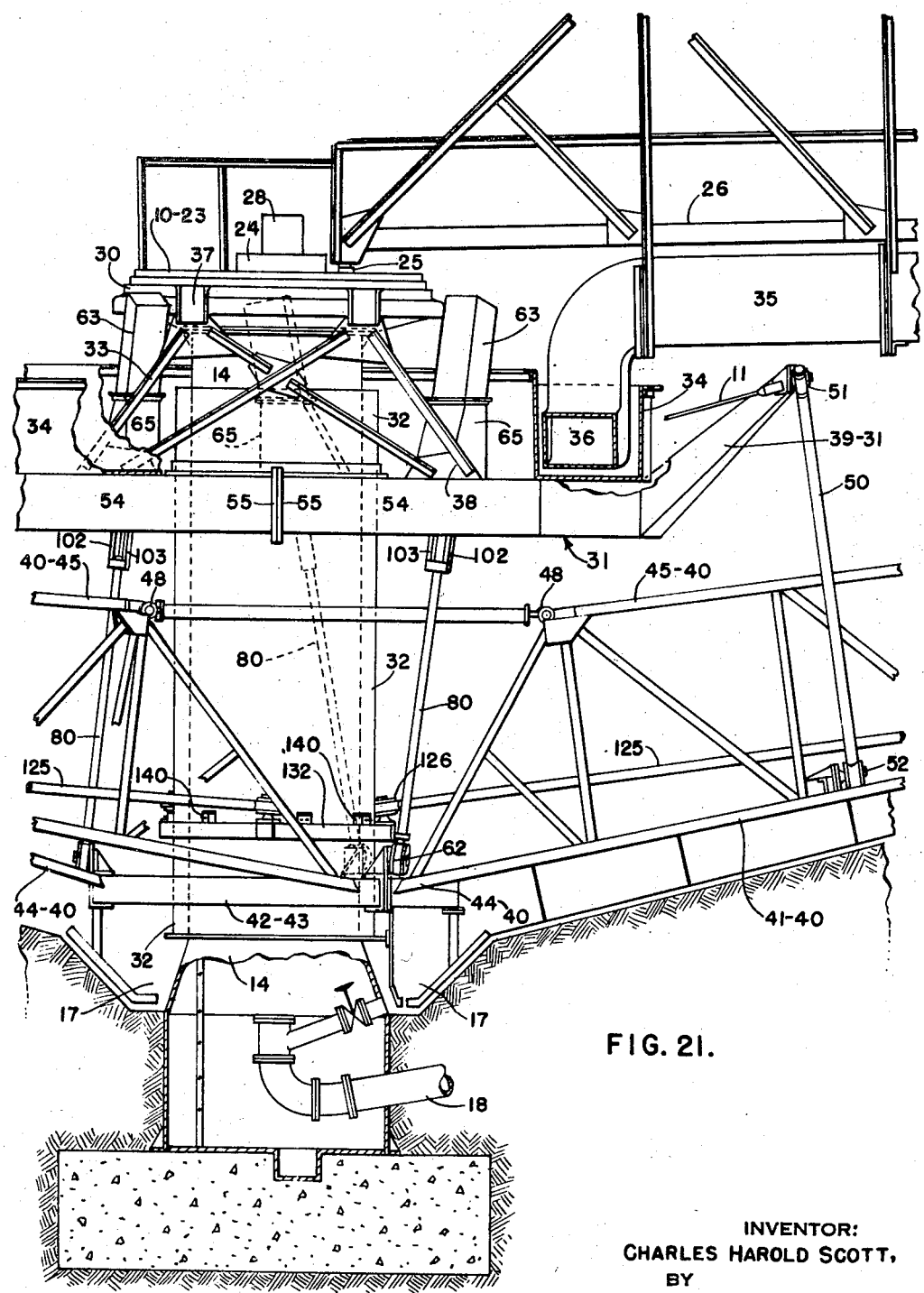
Figure 22:
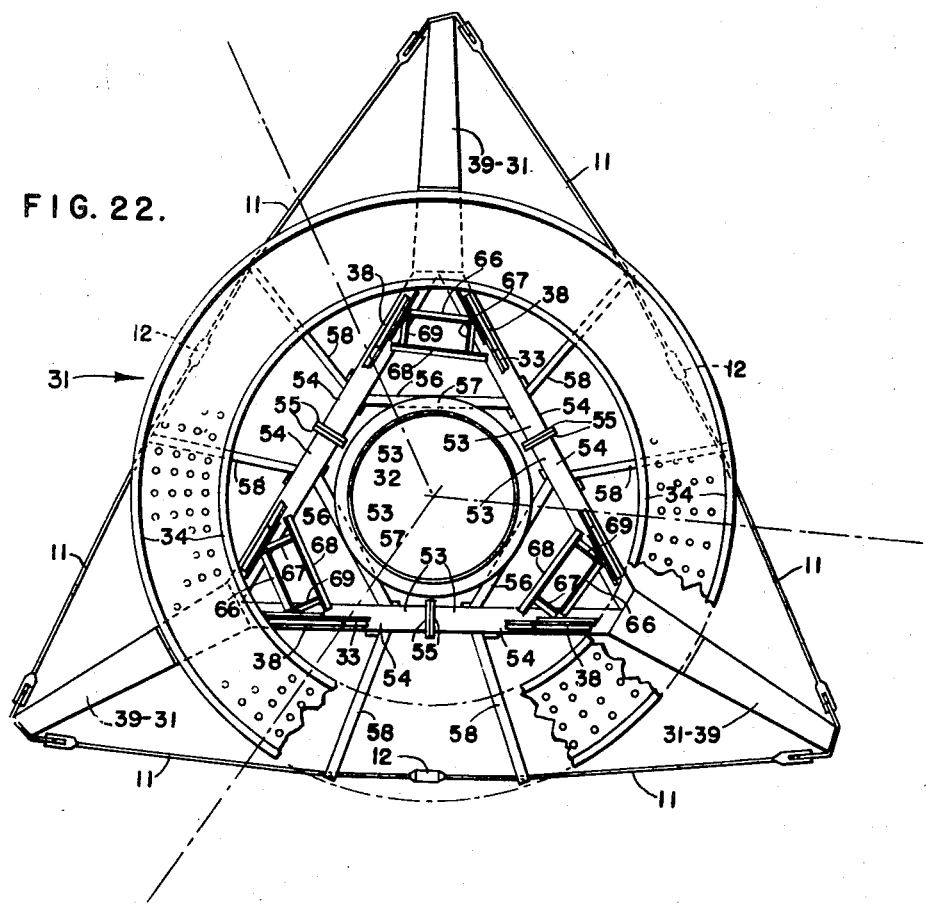
Figure 23:
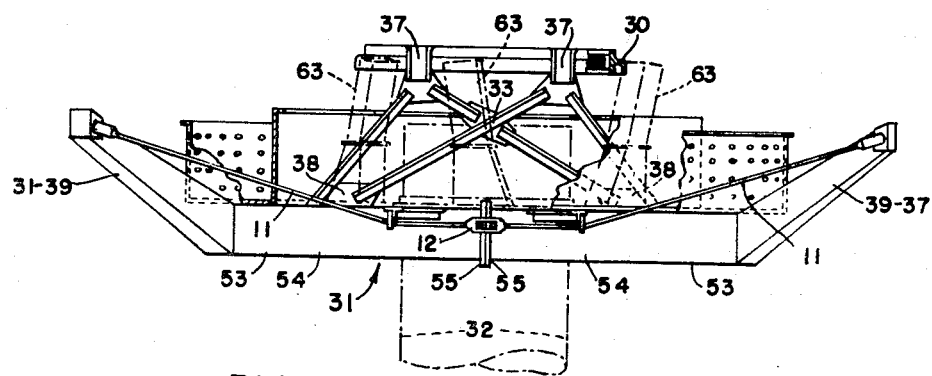

In Figs. 24, 26, 28 and 29 there is indicated how lubricant can be supplied to the ball and socket construction 112 through the medium of a lubrication supply pipe 117. The location of the several lift-rods 80 is clearly apparent from an inspection of the drawings particularly as by Figs. 5 to 11 inclusive, Figs. 17, 18 and 21.

*Centering-rods 125*

Respecting the centering-rods 125 as to details thereof, reference is made to Figs. 30 to 36.

In Fig. 32 there is indicated a section of the depending cylinder 32 which as illustrated is provided at the lower portion thereof with a reinforcing ring 132. This reinforcing ring is directly secured to the depending cylinder 32 in any suitable manner as by being welded thereto whereby rigidity of structure is imparted to the cylinder and also as to the ring itself. On this ring there are secured three connecting members 131 each provided for receiving and for having directly connected thereto a flange 116 of a member that provides the ball 114 of a ball and socket connection generally designated 112. This ball and socket connection is of a construction which is generally the same as that described in connection with the lift-rods 80. As previously indicated the ball and socket connection thus designated 112 includes besides the ball 114 the socket member 113 comprising two socket parts bolted together. A ball and socket construction generally designated 112 is provided for and at each end of each centering-rod 125. The inner end of each centering-rod 125 is designated as 126 and the outer end thereof is designated as 127.

For location of the different parts just referred to see Figs. 30, 31 and 32.

From an inspection of Figs. 30 and 31 it will be readily seen how the ball and socket construction 112 at the inner ends of 125 of the centering-rods can be readily assembled in place and as to their location with respect to the depending cylinder. Also the location of these same parts is indicated by Figs. 17 and 18. There is also indicated the location of the ball and socket construction 112 provided for functioning at and between the outer end 127 of the centering-rods on the one hand and the rake-structures on the other hand. By these figures it will be noted that the flange of the ball providing member 114 can be secured to and supported on a transverse bearing plate 128 that is indicated in said Figs. 17 and 18 and also in Fig. 32.

From an inspection of the drawings it will be noted that the centering-rods extend outwardly, slightly upward and slightly forward with respect to a radial line extending from the central axis about which the depending cylinder 32 is turnably driven.

The ball and socket construction generally designated 112 is directly secured to the inner end 126 of the centering-rod to which it corresponds. The ball and socket connection provided at and for the outer end 127 of the centering-rod is secured thereto through the medium of a pair of bolts 23 that are slidably disposed in bored openings 137 provided in the cross member 128 at and for the outer end 127 of the centering-rod 125 whereby said outer end 127 is of T-shape formation.

As to the connection of the pair of sockets 113 of the ball and socket member 112 which is disposed at the outer ends 127 of the centering-rods it is here pointed out that provision is made for a slight foreshortening of each rod as between the extreme length which the rod must have for the lowermost and foremost functioning position and for the uppermost and rearmost functioning position thereof, for example, as shown in Fig. 32. As a matter of fact when the rake-structure is raised or elevated either due to encountering an abnormal overload condition therefor or being raised by the lift rods, the rake-structure has a lagging rising movement along a helical upward and rearwardly-extending path relative to the drum and there is a limited consequent foreshortening during an intermediate portion of the trailing or lagging movement as this movement may be referred to. Provision for taking care of this foreshortening is indicated by the showings in Figs. 34 to 36 inclusive.

In Fig. 33 the dot and dash line 1, 2 and 3 which is relatively straight illustrates a path of movement for the center of the ball of the outer ball and socket construction 112 as actually encountered because of the construction of the mechanism and of the helical upward and rearward movement which the rake arms 41 as a set take or follow relative to the driven depending cylinder 32 with which they are functionally associated.

The dot and dash line 1, 4 and 3 which is arc-shaped indicates what would be the curved path of the center of the same ball if it were to have a true radial swinging movement about the vertical axis of the depending cylinder 32 such as it would have if there were no modifying influence imposed thereupon, as for example, due to the upward and rearward helical movement which imposes a modification upon a normally expected radial movement. Because of this encountered foreshortening of the centering-rods the ball and socket member 112 for and at the outer end 127 of each centering-rod is connected thereto through the medium of the set of specially employed bolts 123. These bolts have headed ends 135 that are radially inwardly disposed with respect to the cross-members 128 at the outer ends of the centering-rods. The body portions of these bolts extend through bolt-receiving openings 137 provided in the cross-members 128 to which they correspond and the threaded portions 138 of bolts are provided each with an intermediate nut 139 and a set of holding and locking nuts 134. These bolts have true sliding contact in the bolt-receiving openings 137 of the cross-bar 128. The socket members 113 of each ball and socket construction generally designated 112 are firmly clamped in place with respect to the bolts corresponding thereto whereby there results a self-contained socket construction.

In Fig. 34 there is shown the position which the socket construction 112 normally has with respect to the cross-bar 128 at the outer end of the centering-rod. In this figure it will be noted that the head 135 of the bolt directly contacts and engages the cross-bar 128.

In Fig. 35 it will be noted that there is a distance between the heads 135 of the bolts and the cross-bar 128. By this figure there is indicated how the bolts function as a yielding or foreshortening means which is provided for each centering-rod.

From the description just given in connection with the centering-rods, it will be clear how the tri-armed rake-structure which is liftable along an upwardly and rearwardly inclined helical path relative to the depending cylinder 32 can be maintained in concentric relationship thereto because of the concentric rods 125 which are arranged in sets of three and of which the inner ends 126 have pivotal connections to the reinforcing ring 132 on the cylinder through the medium of the ball and socket construction generally designated as 112 and of which the outer ends 127 of the centering-rods have connection through the medium of the ball and socket construction 112 to plates 128 on the three arms 31 of the tri-armed rake-structure 40.

The particular bolt type of connection described may be viewed as a slip-type of connection that is provided between each socket construction 112 and the outer cross-member 128 of the centering-rod 125 and which slip connection results in a centering-rod construction which may also be described as a shortenable centering-rod of maximum length or even as a non-extensible functionally shortening centering-rod.

Steady bearings 140

In order to further assure concentricity as between the depending cylinder 32 against lateral displacement thereof because of a possible local heavy load condition that may be imposed upon the rake-structure 40 there is provided a set of equally spaced steady bearing members 140 located at and between a low portion of the depending cylinder 32 on the one hand and a peripheral section of the pier 14 on the other. Locations of these steady bearings are indicated by Figs. 17 and 18 and details thereof are further amplified by the showing in Figs. 19, 20, 30 and 31. These steady bearings 140 are in the immediate vicinity whereat the reinforcing ring 132 is secured to the depending cylinder, or as otherwise expressed, in the vicinity of the ring to which the inner ends 126 of the centering-rods 125 are located. This steady bearing as a whole is obtained by installing on and about the pier 14 a circular ring 141 that is grouted in place whereby it is held in fixed position on the pier. Much care must be exercised in properly locating and grouting this circular ring 141 in place. The grouting material is designated 143 and is provided by cement deposited in place. In other words, this circular ring 141 must be concentric with the central support bearing member 23 constituting part of a drive-head 19 provided on and at the top of the pier and upon which support bearing the bull-gear 30 is mounted so as to have turning movement about the vertical axis that is determined as to its location because of the central support bearing 23 just mentioned.

As to the depending cylinder 32 there are six equally spaced openings 142 (see Figs. 30 and 31, also 19 and 20) provided for receiving therein steady bearing blocks 144. These steady bearing blocks are of hard-wear resisting material such as oak or lignum vitae or other material suitable for performing the function and for operating in submergence.

As to the bearing blocks 144 they are disposed so that when in operative position the grain of wood has normal extent with respect to the outer bearing surface of the ring which is engaged thereby. There are a number of hollow housing members 145 which are provided for receiving the wood blocks and for holding them in place on the cylinder and in a manner whereby the inner ends of the blocks engage the circular ring. Thusly, it will be realized that the hollow housings must be in alignment with the block-receiving openings 142 referred to. The housings also have cross-end members 146 which are positionably secured to the outwardly-extending parts of the housing structure. These cross-end members have threaded openings for receiving threaded bolts 147 having lock nuts 148. These bolts 147 are arranged in pairs. They extend through the bolt-threaded openings. The inner ends of the bolts engage a movable cross-plate 149 that abuts the outermost ends of the bearing blocks 144. By these bolts pressing against the movable cross-plate the bearing blocks are properly placed in engaging position with the circular ring and when this engaging position has been effected the lock nuts on the bolts are set for realizing a firm locking of the bolts in the required position therefor.

From that which has preceded and also from an inspection of the drawings, it will be noted that the supended bearing portion of the carrier or bull-gear 30 is at elevation substantially higher than that of the elevation of the overflow weir 21. That the outer ends of the rising spider arms 39 are also at elevation substantially higher than that of the overflow weir 21. That the support bearing for the driven carrier or bull-gear 30 is located well above the surface level of the liquid within the basin. That the outer ends of pull-rods 50 which in turn are supported from the outer ends of the spider arms 39 at elevation sufficiently high whereby pull-rods 50 of substantial length can then be effectively employed in and as part of the means for pulling, lifting and positioning the rake-structure 40 as the latter is performing as a sediment-raking function. That the upper ends of the spider arms 39 are at elevation substantially higher than that of the upper surface of the spider body. That the gimbal bearings 64 for the lift-rods 80 are at elevation substantially higher than that of the overflow weir 21 and also that the gimbal bearing 64 is higher than the upper surface of the spider body from which the gimbal support is carried through the medium of the housing section 65.

From the foregoing it will be readily appreciated:

That the raking mechanism is dependingly supported from the driven carrier and is turnable about a vertical axis; also That the raking mechanism embodies:

A tri-armed spider of which the arms in plan are symmetrically arranged and extend upwardly and outwardly from the body portion of the spider;

A liftable tri-armed rake structure of rigid construction having a central ring section and bladed rake-carrying arms extending outwardly therefrom and in plan symmetrically arranged;

A set of rearwardly and downwardly sloping pull-rods the upper ends of which are pivotally connected to the outer ends of the arms of the tri-armed spider and of which the lower forward ends are pivotally connected to corresponding portions of the bladed rake arms and which pull-rods impart forward turning movement to the rake structure during normal raking load conditions but which rods have an upward lifting component functionable to impart raising movement to the rake structure when excessively abnormal raking load condtions are encountered by the rake structure;

A set of forwardly and downwardly sloping non-extensible but functionally shortenable lift-rods that are dependingly carried from gimbal supports mounted in housings carried by and extending upwardly from the body portion of the spider and having the lower ends of the lift-rods pivotally connected to corresponding portions of the central ring section of the rake structure whereby they can function as low stop members, which lift-rods have incorporated therein mechanical foreshortening means actuatable at the will of an operator whereby said rods can be foreshortened for raising the rake structure;

A cage or cylinder dependingly carried from said spider disposed so as to encircle a pier and having spaced relationship about the pier;

A set of centering rods pivotally connected to a stiff outer ring provided at the lower portion of the depending cage, the inner ends of which centering rods are pivotally connected to said ring while the outer ends are pivotally connected to corresponding portions of the bladed rake arms; and A steady-bearing construction embodying a resistance ring of constant elevation fixedly positioned on said pier and concentric with the vertical axis and an outer steady-bearing ring provided as by the aforementioned stiff ring at the lower portion of the cage, and which outer steady-bearing ring has carried thereby and positionably secured thereto steady-bearing blocks of which the inner ends have frictional guided engagement with an outer guiding surface provided on and by the resistance ring of the steady-bearing.

In connection with the structure just outlined it will be noted that the centering-rods referred to are symmetrically arranged with respect to each other and with respect to the vertical central axis about which the rake structure turns; also that the steady-bearing construction described is of constant elevation; also that the inner ends of the centering rods are maintained at constant elevation and the outer ends of the centering rods raise or lower according to any upward or lowering movement of the rake structure and that any tendency to lateral displacement of the rake structure relative to the central axis is absorbed through the medium of the steady-bearing which is of constant elevation and the centering-rods the outer ends of which have upward and lowering movement according to the raising or lowering movement of the rake structure.

I claim:

1. A sediment-raking mechanism which when in operative position with respect to a settler is supported from a driven carrier for unidirectional horizontal turnable movement about a vertical axis; which comprises in combination a spider of constant elevation supported from and turnable with said carrier; a depending cage member concentric with said axis and connected with said spider whereby it is turnable therewith at constant elevation; an elevatable rake structure surrounding the lower portion of said cage and embodying outwardly-extending bladed rake arms; a set of at least three downwardly and rearwardly slanting pull-rods of which the upper ends are respectively pivotally connected to the spider while the lower ends are pivotally connected to corresponding portions of the rake structure; a set of at least three downwardly and forwardly slanting non-extensible but functionally shortenable low stop-rods of which the upper ends derive pivotal support from the spider while the lower ends thereof have means for providing carrying support for the rake structure when the latter is in low sediment-raking position therefor, and a set of at least three centering rods of which the inner ends have pivotal connections at constant elevation to a low end portion of the cage member while the outer ends thereof have pivotal connections to corresponding portions of the elevatable rake structure.

2. A sediment-raking mechanism according to claim 1, in which there are three rods in each of the sets referred to, and in which the rods of each set have symmetrical arrangement with respect to each other and with respect to the axis about which they are disposed.

3. A sediment-raking mechanism according to claim 1, in which there are three rods in each of the sets referred to and in which each of the low stop-rods has embodied therein a length foreshortening means provided by a cylinder of constant elevation and a piston therein raisable from low position therefor and having an upwardly-extending piston rod with a pivotal connection to the upper end portion of the low stop-rod whereby when pressure fluid is simultaneously supplied to the regions within the low inner end of the several cylinders the pistons will be raised to function as a set to positively lift the rake structure from normal low position therefor to an elevated position.

4. A sediment-raking mechanism according to claim 1, in which the low stop-rods embody positively actuated means for foreshortening the same as a set whereby they function as lift-rods, in which the upper ends of the lift-rods are supported from the spider through the medium of a gimbal support, and in which the lower end or ends of the lift-rods are directly secured to the rake structure through the medium of ball and socket connecting means.

5. A sediment-raking mechanism which when in operative position with respect to a settler is supported from a driven carrier mounted for unidirectional horizontal turning movement about a vertical axis and which carrier when in place is mounted on a stationary support bearing having a fixed location with respect to the basin and determines the location of said vertical axis, which said sediment-raking mechanism when in operative position comprises in combination a tri-armed spider supported from said carrier as well as turnable therewith and whose arms are in plan symmetrically arranged about said vertical axis; a depending cylinder concentric with said axis and rigidly connected to said spider so as to be turnable therewith; a vertically movable rake structure embodying three bladed rake-carrying arms which in plan are symmetrically arranged about said vertical axis; a set of three downwardly and rearwardly slanting pull-rods of which the upper ends are respectively pivotally connected to the spider arms while the lower ends are pivotally connected to corresponding portions of the bladed rake-carrying arms; a set of three non-extensible but functionally shortenable low stop-rods of which the upper ends derive pivotal support from the spider while the lower ends have means thereat for providing carrying support for the rake structure when the latter is in low sediment-raking position therefor; and a set of three symmetrically arranged centering rods of which the inner ends have pivotal connections to a low end portion of said cylinder while the outer ends thereof have pivotal connections to the rake structure.

6. A sedimentation unit comprising a basin having a bottom with a marginal wall rising therefrom, means for supplying a liquid-solids mixture to the basin, supernatant liquid-withdrawal means leading from the upper portions of the basin and having an overflow weir member that establishes normal surface level of the liquid within the basin, a sediment discharge means leading from a low portion of the basin, a pier rising from the bottom of the basin, a stationary central bearing deriving support from the pier, a carrier mounted on the stationary central bearing and turnable in a unidirectional circular path about a vertical axis determined as to its location by the stationary central bearing, means for imparting driven turning movement to the carrier, a rigid rake structure having a hollow central section surrounding but spaced from the pier with bladed rake-carrying arms extending outwardly from the hollow central section, means by which the rake structure has lifting support from the carrier, a circular resistance ring concentrically connected to the pier at an elevation lower than that of the overflow weir and constituting a part of a steady-bearing construction of constant elevation, a horizontally turnable ring serving as an outer member of the steady-bearing construction having a series of steady-bearing block members held on the ring adapted for constant horizontal sliding engagement with respect to a circular outer guiding surface of the ring, and several centering rods symmetrically arranged about the vertical axis whose inner ends are pivotally connected to corresponding sections of the ring and whose outer ends are pivotally connected to corresponding portions of the horizontally turnable but liftable rake structure.

7. A sedimentation unit comprising a basin having a bottom with marginal wall, means for supplying a liquid-solids mixture to the basin, supernatant liquid withdrawal means leading from the upper portion of the basin and a sediment-discharge means leading from the central lower portion of the basin; and in association with the foregoing a sediment-impelling means having a motor actuated carrier mounted on a central support bearing and driven so as to have a forward unidirectional turning movement about a vertical axis which sediment-impelling means is characterized in that it includes a raking mechanism comprising in combination a tri-armed spider supported from and turnably driven by said carrier; a cylinder concentric with said vertical axis rigidly connected to and turnable with said spider; a tri-armed rake structure embodying outwardly-extending bladed rake-carrying arms which in plan are symmetrically arranged about said axis; a set of three downwardly and rearwardly slanting pull-rods of which the upper ends are pivotally connected to the outer ends of the arms of the spider while the lower ends are pivotally connected to corresponding portions of the bladed rake-carrying arms; a set of three downwardly and forwardly slanting non-extensible but functionally shortenable lift-rods that function as low stop-rods of which the upper ends derive pivotal support from the spider while the lower ends thereof have means for providing carrying support for the rake structure when the latter is in low sediment-raking position therefor; and a set of three outwardly-extending centering rods of which the inner ends have pivotal connections each to a low end portion of the depending cylinder while the outer ends thereof have pivotal connections to corresponding portions of the bladed rake-carrying arms; the three rods of each of aforementioned sets having symmetrical arrangement with respect to each other and with respect to the axis about which they are disposed.

8. A sediment unit according to claim 7, in which the raking mechanism is further characterized in that each of the three lift rods has embodied therein a length foreshortening means provided by a cylinder of constant elevation and a piston therein raisable from a normal low position therefor and having an upwardly-extending piston rod with a pivotal connection to the upper end portion of the lift rod whereby when pressure fluid is simultaneously supplied to the regions within the low interior ends of the pistons will be raised to function as a set to positively lift the rake structure from normal low position therefor to elevated position.

9. A sedimentation unit according to claim 7, in which the raking mechanism is further characterized in that each lift rod embodies mechanical means for elevating the upper end of the lift rod with respect to the spider, and also in that the pivotal support for the upper end of each lift rod is provided by a gimbal support carried by the spider on the one hand and which gimbal support in turn carries the upper end of the lift rod.

10. A sediment-raking mechanism for employment in a settling basin having a central stationary support bearing carried on a member fixedly positioned with respect to the basin and having mounted on said stationary support a carrier driven whereby when continuous actuating forces are applied to said carrier it has imparted thereto unidirectional turning movement about a vertical axis and therefrom to a sediment-raking mechanism actuated thereby; which said raking mechanism is characterized in that it includes in operative combination a tri-armed spider connected to, supported from and turnably driven by said carrier; a depending cylinder rigidly connected to and turnable with said spider and disposed to be concentric with said vertical axis; a tri-armed rake structure embodying outwardly-extending bladed rake-carrying arms which in plan are symmetrically arranged about said axis; a set of three downwardly and rearwardly slanting pull-rods of which the upper ends are pivotally connected to the outer ends of the arms of the spider while the lower ends are pivotally connected to corresponding portions of the bladed rake-carrying arms; a set of three downwardly and forwardly slanting non-extensible but functionally shortenable lift-rods that function as low stop-rods of which the upper ends derive pivotal support from the spider while the lower ends thereof have means for providing carrying support for the rake structure when the latter is in low sediment-raking position therefor; and a set of three outwardly-extending centering rods of which the inner ends have pivotal connections each to a low end portion of the depending cylinder while the outer ends thereof have pivotal connections to corresponding portions of the bladed rake-carrying arms.

11. A sediment-raking mechanism according to claim 10, further characterized in that the spider has a horizontal body portion from which the three arms thereof extend outwardly and upwardly; in that there are three pull-rod housing structures that are carried by and extend upwardly from the body portion of the spider; and in that the upper ends of the lift-rods are supported by and through the medium of gimbal bearings of which the base portions are supported by the housings at elevations above that of the body portion of the spider while the upper portions of the gimbal bearings in turn respectively support the upper ends of the lift-rods.

12. A sediment-raking mechanism according to claim 10, further characterized in that an annular feed-distributing well is rigidly connected in place on and to the spider for thereby imparting strength and for imparting rigid characteristics to the spider.

13. A sediment-raking mechanism according to claim 10, further characterized in that the spider supports have three lift-rod housings rising from the spider; in that pivot shafts provide parts of gimbal supports mounted on trunnion bearings carried by the housings; in that the upper ends of depending cylinders are respectively connected to and supported from pivot shafts to which the cylinders correspond; in that there are pistons having heads that are functionally disposed within the several cylinders and having rising piston rods extending upwardly from within the cylinders and thence through openings in the respective pivot shafts; in that cross-bars located above the pivot shafts are respectively carried at the outer ends of the rising piston rods to which they correspond and in that the ends of the cross-bars are respectively provided with trunnions extending into receiving openings therefor at the upper ends of lift-rods corresponding to the cross-heads.

14. A sedimentation unit comprising a basin having a bottom with a marginal wall rising therefrom; means for supplying a liquid-solids mixture to the basin; supernatant liquid withdrawal means leading from the upper portion of the basin and having an effluent weir member that establishes the normal surface level of the liquid within the basin; a sediment-discharge means leading from the central lower portion of the basin; a pier rising from the central portion of the basin and affording carrying support for a stationary center bearing mounted thereupon and extending to an elevation higher than that of the overflow weir; and in association with the foregoing a sediment-impelling means having a motor-actuated carrier mounted on said central support bearing and driven so as to have forward unidirectional turning movement about a central vertical axis, which sediment-impelling means is characterized in that it includes a raking mechanism comprising in operative combination a spider supported from and turnably driven by said carrier; a depending cage rigidly connected to and turnable with said spider about said axis; a rake structure embodying outwardly-extending bladed rake-carrying arms for operating over and along the bottom of the basin; a set of several downwardly and rearwardly slanting pull-rods of which the upper ends are pivotally connected to the spider while the lower ends are pivotally connected to corresponding portions of the rake structure; a set of several downwardly and forwardly slanting non-extensible but functionally shortenable lift-rods of which the upper ends derive pivotal support from the spider while the lower ends thereof have pivotal means for providing carrying support for the rake structure when the latter is in low sediment-raking position therefor and a set of several centering rods of which the inner ends have pivotal connections to the low end portion of the cage member while the outer ends thereof have pivotal connections to corresponding portions of the rake structure; the rods of each of the aforementioned sets having symmetrical arrangement with respect to each other and with respect to the axis about which they are disposed.

15. A sediment-raking mechanism according to claim 14 in which the spider has upwardly and outwardly extending rake arms corresponding in number to the pull-rods referred to, the upper ends of which pull-rods are connected to the upper outer ends of the respective arms and which points of connection are at an elevation higher than that of the overflow weir.

16. A sediment-raking mechanism according to claim 14 in which the spider carries the lift-rod housings corresponding in number to the lift-rods and gimbal supports provided in and for each housing, the base portions of which gimbal supports are at an elevation higher than that of the body portion of the spider and the upper end of each lift-rod is pivotally connected to an upper portion of the gimbal support and at an elevation substantially higher than that of the overflow weir.

17. A sediment-raking mechanism as defined in claim 14 in which there is provided a circular resistance ring which when fixedly secured in place on the center pier of the basin is concentric with the vertical axis and constitutes a fixed guide member at an elevation lower than that of the effluent weir and in which there is carried by and adjustably secured in place at the lower end portion of the cage several positionably-held steady bearing blocks disposed in frictional guiding engagement with the outer portion of the circular resistance ring whereby the steady bearing construction is completed.

18. A sedimentation unit comprising a basin having a bottom with a marginal wall rising therefrom and an upstanding pier rising from said bottom; a sediment-impelling means which when in operative position with respect to said basin includes a stationary central bearing deriving support from said pier and in turn supporting a carrier mounted on said central bearing and turnably driven in a forward horizontal direction about a vertical axis determined as to its location by the center bearing, said sediment-impelling means having a vertically liftable rake structure of rigid construction embodying a central section encircling said pier and outwardly extending bladed rake-carrying arms which in plan are symmetrically arranged about and with respect to said vertical axis; means actuated from said carrier and provided for turning said rake structure about said axis; means supported from said carrier and provided for raising said rake structure from low normal sediment-raking position therefor; and means turnable with said carrier and serving for arresting downward movement of said rake structure upon its reaching the low normal sediment-raking position therefor; said sediment impelling means being characterized in that it includes a steady bearing construction of constant elevation embodying a guiding resistance ring fixedly secured to said pier and having a peripheral surface concentric with said axis and a horizontal turnable stiff outer ring surrounding said resistance ring and equipped with a series of steady-bearing blocks horizontally held on said outer ring the inner ends of said blocks having guided sliding engagement horizontally along the peripheral surface of said guiding resistance ring; and a set of several outwardly extending centering rods having symmetrical arrangement about and with respect to said vertical axis, the inner ends of which centering rods are pivotally connected to said turnable outer ring while the outer ends of said rods are pivotally connected to corresponding portions of the rake structure.

19. A sedimentation unit comprising a basin having a bottom with a marginal wall rising therefrom; means for supplying a liquid-solids mixture to the basin; supernatant liquid-withdrawal means leading from the upper portion of the basin and having an effluent weir member that establishes the normal surface level of the liquid with the basin; a sediment discharge means leading from a lower portion of the basin; a pier rising from the central portion of the basin; a drive head embodying a central bearing deriving support from the pier and also embodying a driven carrier mounted on said center bearing and turnable in the unidirectional circular path about a vertical axis determined as to its location by said central bearing; motivated speed-reducing and power transmission means for imparting the driven turning movement to said carrier and in association with the foregoing sediment-impelling means characterized in that it embodies a sediment-raking mechanism having a tri-armed spider of constant elevation with outwardly and upwardly extending arms; a tri-armed rake structure normally occupying a low raking-position therefor but raisable from said low-raking position upon abnormally excessive raking load conditions being encountered thereby; three downwardly and rearwardly sloping pull rods the upper ends of which pull rods are respectively pivotally connected to the arms of the tri-armed spider while the lower ends are respectively pivotally connected to corresponding arm portions of the tri-armed rake structure; three forwardly and downwardly extending non-extensible but functionally shortenable low stop-rods the upper ends of which stop-rods have pivotal connections to gimbal supports carried by the spider while the lower ends have pivotal connections to corresponding portions of the rake structures; a cage of constant elevation depending from said spider and spacedly surrounding said pier; three outwardly extending centering rods the inner ends of which are respectively connected to corresponding low portions of the descending cage while the outer ends of said centering rods are connected to corresponding arm portions of the raisable tri-armed rake structure; and a steady-bearing construction lower than that of said overflow weir and provided between a low portion of the depending cage on the one hand and the pier on the other.

CHARLES HAROLD SCOTT.

REFERENCES CITED

The following references are of record in the file of this patent:

UNITED STATES PATENTS

| Number | Name | Date |
|---|---|---|
| 2,036,809 | Humphreys et al. | Apr. 7, 1936 |
| 2,064,151 | Coulter | Dec. 15, 1936 |
| 2,265,046 | Sabin | Dec. 2, 1941 |
| 2,418,973 | Hardinge | Apr. 15, 1947 |